United States Patent [19]
Abe et al.

[11] Patent Number: 5,624,195
[45] Date of Patent: Apr. 29, 1997

[54] LIGHT-WEIGHT MINIATURE LINEAR GUIDE DEVICE

[75] Inventors: Yasushi Abe; Toru Tsukada, both of Gunma, Japan

[73] Assignee: NSK Ltd., Tokyo, Japan

[21] Appl. No.: 355,347

[22] Filed: Dec. 12, 1994

[30] Foreign Application Priority Data

Dec. 10, 1993 [JP] Japan .................. 5-310858

[51] Int. Cl.$^6$ ................ F16C 33/72; F16C 29/06
[52] U.S. Cl. ............................. 384/15; 384/45
[58] Field of Search ................. 384/15, 45, 49

[56] References Cited

U.S. PATENT DOCUMENTS

| | | | |
|---|---|---|---|
| 2,951,728 | 9/1960 | Drake | 384/15 |
| 4,854,741 | 8/1989 | Mottate et al. | 384/45 |
| 4,892,415 | 1/1990 | Katahira | 384/45 |
| 5,387,038 | 2/1995 | Abe et al. | 384/15 |

FOREIGN PATENT DOCUMENTS 63-12903  4/1988  Japan .

Primary Examiner—Thomas R. Hannon
Attorney, Agent, or Firm—Sughrue, Mion, Zinn, Macpeak & Seas

[57] ABSTRACT

A light-weight miniature linear guide device provides: a guide rail including a first load ball rolling groove formed on an inner surface of the guide rail and extended longitudinally; a slider including a slider body adapted to be fitted in the guide rail, the slider body including a second load ball rolling groove formed on an outer surface of the slider body, and a circulator fitted in the slider body, the circulator having a non-load ball circulating path which is extended longitudinally; a plurality of balls fitted to roll in a space defined by the first and second load ball rolling grooves and the non-load ball circulating path of the circulator. Further, in the miniature linear guide device, the slider body includes a protrusion formed in a longitudinal end portion of the slider body, and a sealing member is secured to the protrusion to sealingly close a gap formed between the inner surface of the guide rail and the slider body. The miniature linear guide device can smoothly be operated even in a dusty atmosphere and prevented from scattering lubricant to lengthen the service life.

18 Claims, 9 Drawing Sheets

LIGHT-WEIGHT MINIATURE LINEAR GUIDE DEVICE

BACKGROUND OF THE INVENTION

The present invention relates to a light-weight miniature liner guide device which is suitable for relatively small equipment such as equipment concerning computers, OA (office amenity) equipment and measuring equipment.

A conventional miniature linear guide device is for instance as shown in FIGS. 18 and 19. The linear guide device is made up of a guide rail 1 substantially U-shaped in section which is extended in a longitudinal direction (or axial direction) of the device, and a slider 2 slidably mounted on the guide rail 1. The slider 2 provides: a slider body 3 U-shaped inversely in section which is formed of a thin steel plate by pressing; a circulator 4 which is formed of plastic by molding and has ball circulating paths therein; and a cap 5 which is formed of plastic. The circulator 4 and the cap 5 are fitted in a concave portion of the slider body 3 in such a manner that the cap 5 is interposed between the slider body 3 and the circulator 4.

Load ball rolling grooves 1B and 3B are formed in the inner surfaces of both side walls of the guide rail 1 and in the outer surfaces of both side walls of the slider body 3, respectively, in such a manner that those grooves 1B and 3B are extended in an axial direction of the guide device and confronted with each other. A number of balls 6 are fitted in the load ball rolling grooves 1B and 3B and in the ball circulating paths in the circulator 4. The balls 6 are infinitely circulated while being rolled so that the slider 2 is linearly moved along the guide rail 1.

The above-described conventional linear guide device suffers from the following difficulties:

The linear guide device has been provided with the premise that it is used in a clean atmosphere, for instance in a clean room which is substantially free from dust; that is, it is not protected from dust. Hence, if it is used in an atmosphere other than a clean atmosphere, then dust enters the linear guide device, thus adversely affecting the operation of the linear guide device.

On the other hand, lubricant such as grease and lubricating oil are liable to scatter out through the gaps between the guide rail and the end faces of the slider engaged with the guide rail. This makes the linear guide device insufficient in lubrication, thus decreasing the service life of the linear guide device.

SUMMARY OF THE INVENTION

Accordingly, an object of the present invention is to eliminate the difficulties accompanying a conventional light-weight miniature linear guide device.

More specifically, an object of the present invention is to provide a light-weight miniature linear guide device which has a sealing device simple in construction which allows the guide device to smoothly operate even in a dusty atmosphere, and prevents the scattering of lubricant from the guide device, thus lengthening the service life, and reduces the manufacturing cost.

The foregoing object and other objects of the present invention have been achieved by the provision of a light-weight miniature linear guide device, according to a first aspect the present invention, providing: a guide rail substantially U-shaped in section which is extended in a longitudinal direction of the device, the guide rail including a first load ball rolling groove formed on an inner surface of a side wall of the guide rail and extended longitudinally; a slider including a slider body substantially U-shaped in section which is adapted to be fitted in the side wall of the guide rail in which the slider body includes a second load ball rolling groove formed on an outer surface of a side wall of the slider body and confronted with the first load ball rolling groove of the guide rail, and includes a protrusion formed in a longitudinal end portion of the slider body; and a circulator being fitted in the slider body so that the protrusion of the slider body overhangs a longitudinal end portion of the circulator, the circulator having a non-load ball circulating path which is extended longitudinally; a plurality of balls fitted to roll in a space defined by the first and second load ball rolling grooves and the non-load ball circulating path of the circulator; and a sealing member secured to the protrusion to sealingly close a gap formed between the inner surface of the guide rail and the slider body.

According to a second aspect the present invention, the foregoing object and other objects have been achieved by the provision of a light-weight miniature linear guide device providing: a guide rail substantially U-shaped in section which is extended in a longitudinal direction of the device, the guide rail including a first load ball rolling groove formed on an inner surface of a side wall of the guide rail and extended longitudinally; a slider including: a slider body substantially U-shaped in section which is adapted to be fitted in the side wall of the guide rail in which the slider body includes a second load ball rolling groove formed on an outer surface of a side wall of the slider body and confronted with the first load ball rolling groove of the guide rail, and includes a protrusion formed in a longitudinal end portion of the slider body, the protrusion including a scraper in close proximity to the inner surface of the said guide rail; and a circulator being fitted in the slider body so that the protrusion of the slider body overhangs a longitudinal end portion of the circulator, the circulator having a non-load ball circulating path which is extended longitudinally; and a plurality of balls fitted to roll in a space defined by the first and second load ball rolling grooves and the non-load ball circulating path of the circulator.

In the device of the first aspect the present invention, the sealing members secured to both ends of the slider body sealingly close not only the gaps formed between the guide rail and both end faces of the slider engaged with the guide rail but also the load ball rolling grooves formed in the inner surfaces of the side walls of the guide rail. Hence, the sealing members of the slider act to wipe the dust off the guide rail as the slider is moved along the guide rail, and they prevent the entrance of dust into the slider. Moreover, for the same reason, the leakage of lubricant from the slider is prevented by the sealing members.

In the device of the second aspect the present invention, foreign matters stuck fast to the guide surface of the guide rail can be removed with the scrapers, because the scrapers are set in close to the inner surface of the guide rail.

BRIEF DESCRIPTION OF THE DRAWINGS

In the accompanying drawings:

FIGS. 11A and 11B are a perspective view and a sectional view showing a sealing device, respectively, and FIG. 11C is a perspective view showing one modification of the sealing device shown in FIGS. 11A and 11B;

DETAILED DESCRIPTION OF THE PREFERRED EMBODIMENTS

Preferred embodiments of the present invention will be described with reference to the accompanying drawings.

First Embodiment

Figure 1:
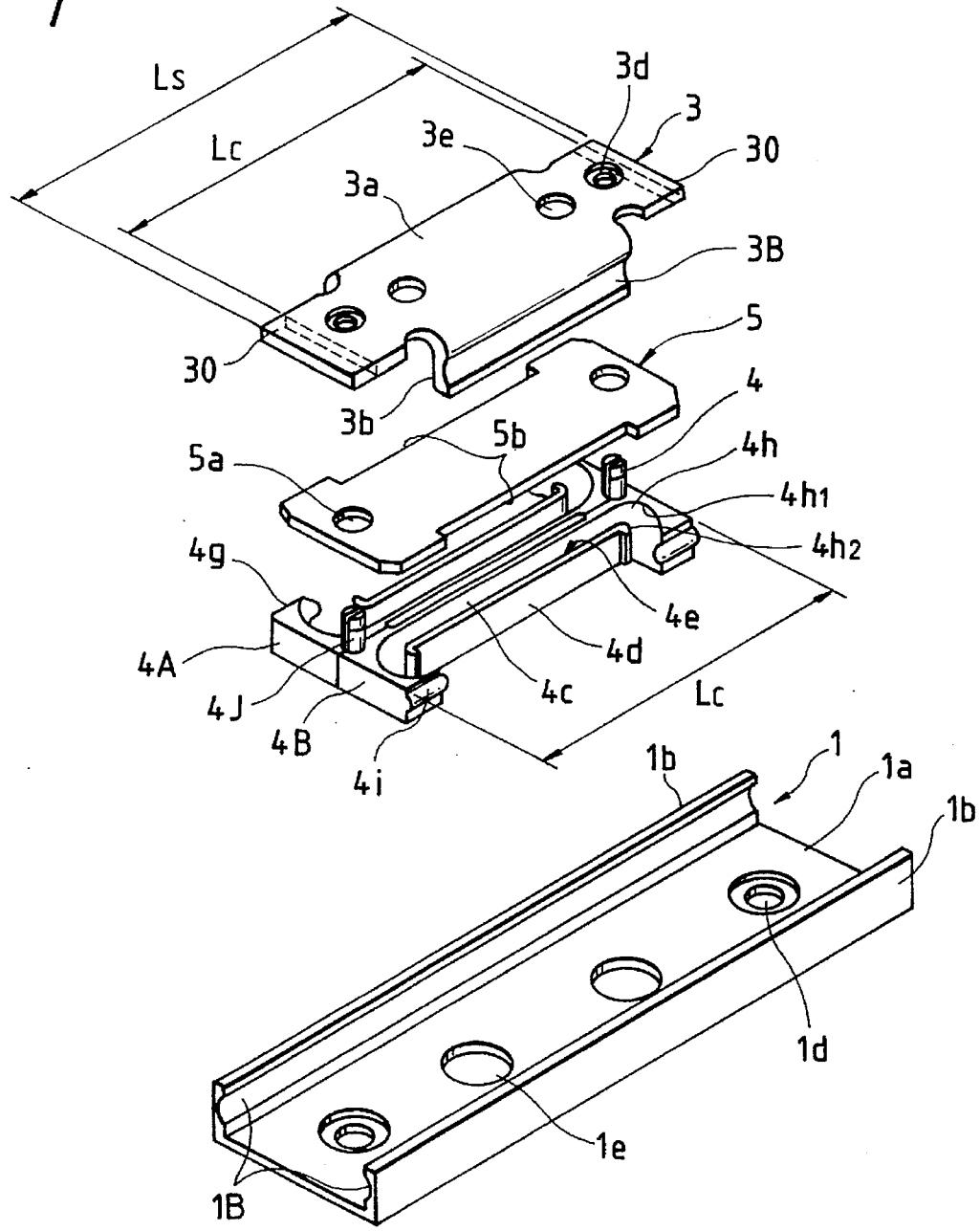
FIG. 1 is an exploded perspective view showing essential components of an example of a light-weight miniature linear guide device, which constitutes a first embodiment of the present invention.
Figure 2A:
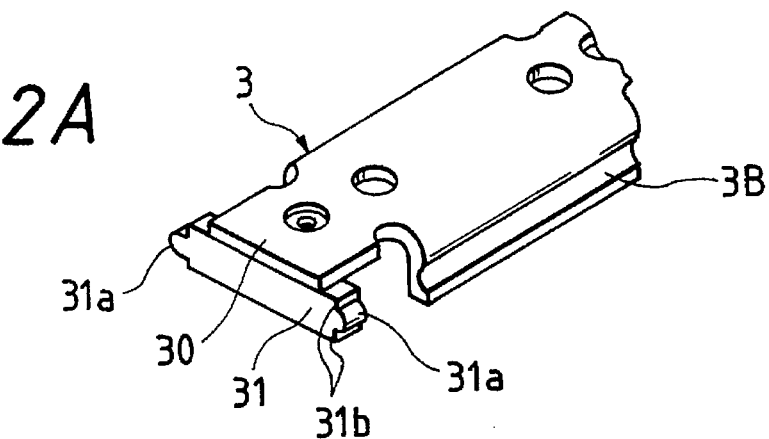
FIGS. 2A and 2B are a perspective view and a side view, respectively, showing a sealing device in the first embodiment.
Figure 2B:
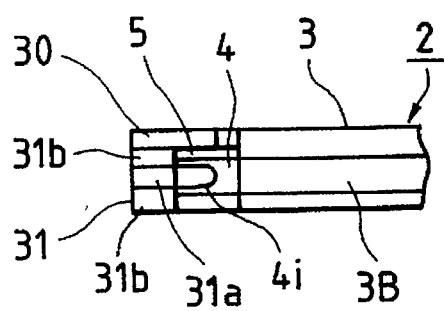
Figure 3:
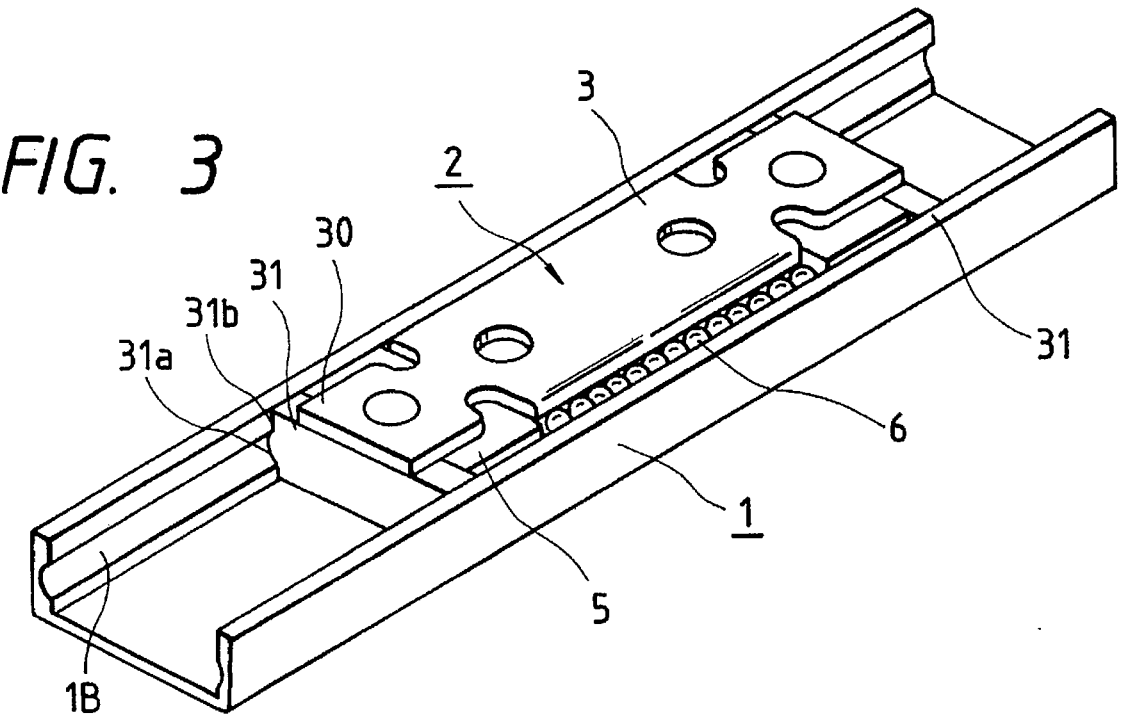
FIG. 3 is a perspective view showing the components shown in FIG. 1 which have been assembled.
Figure 18:
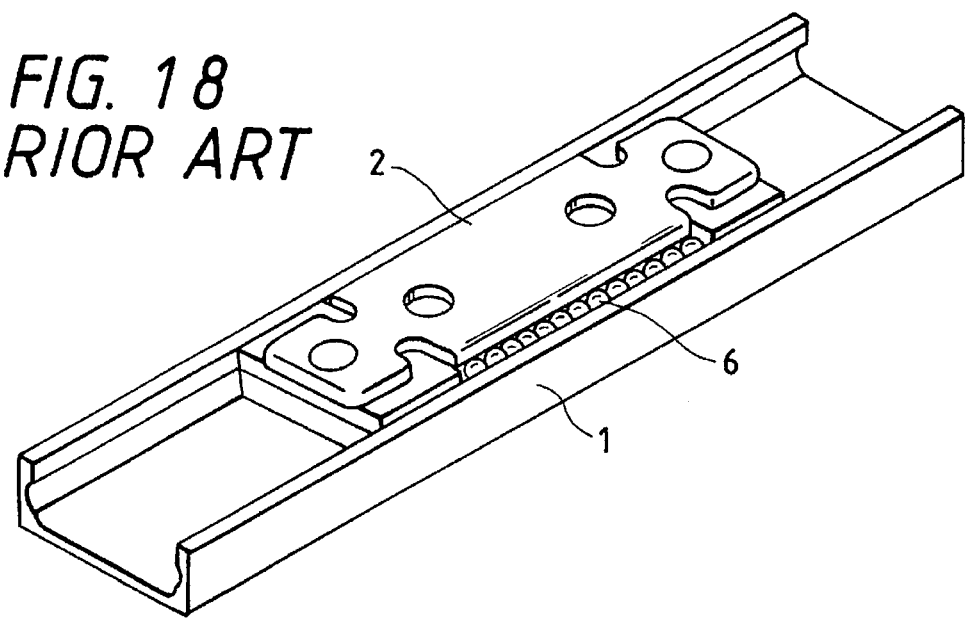
FIGS. 18 and 19 are a perspective view and an exploded perspective view, respectively, showing a conventional miniature linear guide device.
Figure 19:
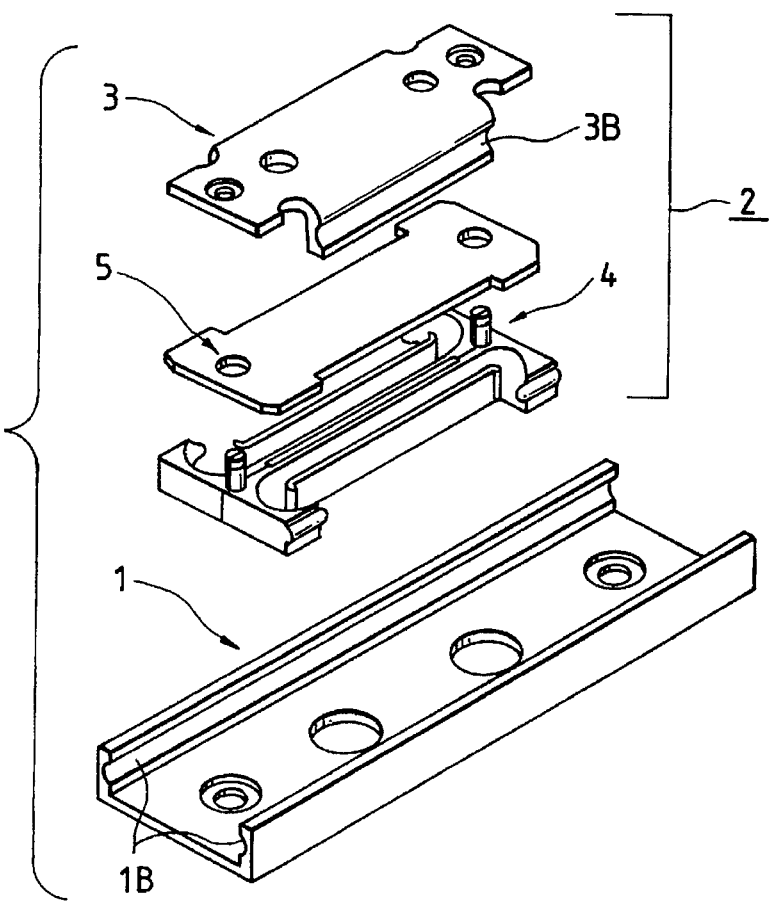

A light-weight miniature linear guide device, which constitutes a first embodiment of the present invention, is as shown in FIGS. 1 through 3, in which parts corresponding functionally to those which have been described with reference to the conventional linear guide device shown in FIGS. 18 and 19 are therefore designated by the same reference numerals or characters.

As shown in FIGS. 1 through 3, the linear guide device provides a guide rail 1, a slider 2 slidably mounted on the guide rail 1, and a number of ball 6 fitted in between the guide rail 1 and the slider 2.

The guide rail 1 is adapted to guide the slider 2, and is formed of a steel plate by pressing. The guide rail 1 is substantially U-shaped in section having a bottom 1a and two side walls 1b and 1b which are extended upwardly from both ends of the bottom 1a. A pair of load ball rolling grooves 1B are formed in the side walls 1b and 1b in such a manner that they are extended in a longitudinal direction of the guide rail 1 and are in parallel with each other. The grooves 1B are substantially semi-circular in section. The bottom 1a of the guide rail has spot-faced holes 1d, and accuracy measuring holes 1e. The spot-faced holes 1d are provided for bolts with which the guide rail 1 is secured to a suitable member when it is required to use the linear guide device.

The slider 2 provides: a slider body 3 having a length of Ls which is formed of a thin steel plate; a circulator 4 of synthetic resin having a length of Lc; and a cap 5 of synthetic resin.

The slider body 3 is substantially inverted-U-shaped in section having an upper wall 3a and both side walls 3b and 3b extended downwardly from both ends of the upper wall 3a. The distance between the outer surfaces of the side walls 3b and 3b is slightly smaller than the distance between the inner surfaces of the side walls 1b and 1b of the guide rail 1. The slider body 3 thus formed is set between the side walls 1b and 1b of the guide rail 1. A pair of load ball rolling grooves 3B are formed in the outer surfaces of the side walls 3b and 3b of the slider body 3, respectively, in such a manner that they are extended in a longitudinal direction of the slider body 3 and confronted with the above-described load ball rolling grooves 1B of the guide rail 1, respectively. The load ball rolling grooves 3B are also substantially semi-circular in section.

The length Ls of the upper wall 3a of the slider body 3 is larger than that Lc of the circulator 4. Both end portions of the upper wall 3a are formed into flat-plate-shaped protrusions 30 and 30, respectively. The length (Ls–Lc)/2 of each of the protrusions 30 corresponds to the thickness of a sealing member 31 made of synthetic rubber. Each of the sealing members 31 is secured to the lower surface of each of the protrusions 30 by bonding or welding. As shown in FIG. 3, the circulator 4 and the cap 5 are combined with the slider body 3 in such a manner that they are embraced by the seal members 31 secured to the protrusions 30 of the slider body 3. Thus, the slider 2 has been assembled. Further, each of the sealing members 31 has a pair of semi-circular sealing ears 31a at both (right and left) ends and lips 31b on its sides. When the slider 2 thus assembled is engaged with the guide rail 1, the sealing ears 31a of the sealing members 31 are brought into slide contact with the load ball rolling grooves 1B of the guide rail 1, while the lips 31b of the sealing members 31 are brought into slide contact with the inner surfaces of the guide rail; that is, the slider 2 is sealingly engaged with the guide rail 1.

A pair of spot-faced holes 3d are formed in the upper wall 3a of the slider body 3 near both ends as viewed longitudinally of the slider body 3. In addition, the upper wall 3a has a pair of mounting holes 3e between the spot-faced holes 3d which are used to secure the slider 2 to a suitable member such as a table.

The circulator 4 is formed by joining a pair of half members 4A and 4B together which are formed symmetrical in configuration together by injection molding. FIG. 1 shows the members 4A and 4B which have been joined together. The circulator 4 formed by joining those half members 4A and 4B together has a barrel substantially E-shaped in section which includes a central wall 4c and right and left walls 4d and 4d located on both sides of the central wall 4c, and a pair of non-load ball circulating grooves 4e and 4e which are axially extended between the central wall 4c and the right and left walls 4d and 4d provided on both sides of the center wall 4c. The barrel is fitted in between the side walls 3b of the slider body 3. Each of the end portions of the barrel, as viewed longitudinally of the barrel, are formed into a pair of flanges 4g which are extended right and left. That is, each of the half members 4A and 4B forming the circulator 4 has the flanges 4g at both ends as viewed longitudinally thereof. The flanges 4g have semi-circularly curved grooves 4h which are communicated with the respective non-load ball circulating grooves 4e and 4e. On each side of the circulator 4, the non-load ball circulating groove 4e and the semi-circularly curved grooves 4h and 4h located at both ends of the non-load ball circulating groove 4e form a non-load ball circulating path. That is, the circulator 4 has a pair of non-load ball circulating paths. Both end portions of each of the right and left walls 4d and 4d, as viewed longitudinally of the walls, are arcuately curved as indicated at $4h_2$ (hereinafter referred to as "inner arcuate surfaces $4h_2$", when applicable) in correspondence to the outer arcuate surfaces $4h_1$ of the semi-circularly curved grooves 4h, so that the balls are smoothly guided. The side portion of each of the flanges 4g is formed into a ball scooping protrusion 4i which is engaged with the respective non-load ball rolling groove 1B, so as to facilitate the circulation of the balls 6. The circulator 4 further includes a pair of cylindrical engaging protrusions 4j on the upper surfaces of the flanges 4g. More specifically, each of the above-described half-members 4A and 4B has a pair of protrusions, which are like two parts obtained by dividing a cylinder along its central axis (hereinafter referred to as "half-cylinders", when applicable), respectively on the pair of flanges 4g, and the half-cylinders of the half members 4A and 4B are joined together to form the above-described cylindrical engaging protrusions 4j as shown in FIG. 1.

The cap 5 is to hold the half-members 4A and 4B of the circulator 4 together. A pair of through-holes 5a and 5a are formed in the cap 5 near both ends as viewed longitudinally of the cap, into which the above-described cylindrical engaging protrusions 4j are inserted. A pair of cuts 5b are formed in the right and left side portion of the cap 5 so that they are loosely engaged with the side walls 3b and 3b of the slider body 3, respectively.

The slider 2 is assembled as follows:

The pair of half-members 4A and 4B are joined together to form the cylindrical engaging protrusions 4j. The engaging protrusions 4j thus formed are inserted into the through-holes 5a of the cap 5, respectively. Thus, the cap 5 has been mounted on the circulator 4. Thereafter, the slider body 3 is mounted on the cap 5 and the circulator 4 by inserting the engaging protrusions 4j into the spot-faced holes 3d of the slider body 3.

Under this condition, the heads of the engaging protrusions 4j appearing in the upper surface of the slider body 3 are welded thereto so that the slider body 3 is secured to the circulator 4 with the cap 5 interposed between them. Thus, the slider 2 has been assembled. In the slider 2 thus assembled, the non-load ball circulating grooves 4e and the curved grooves 4h are covered with the cap 5, and at the open ends of the curved grooves 4h the inner arcuate surfaces $4h_2$ are smoothly connected to the load ball rolling grooves 3B, thus forming the non-load ball circulating paths.

The slider 2 thus assembled is loosely engaged with the guide rail 1, and a number of balls 6 are put in the above-described non-load ball circulating paths and between the load ball rolling grooves 1B of the guide rail 1 and the load ball rolling grooves 3B of the slider 2.

The outer arcuate surfaces $4h_1$ of the curved grooves 4h are set adjacent to the bottoms of the load ball rolling grooves 1B of the guide rail 1 through the ball scooping protrusions 4i extended from the sides of the flanges 4g, which enhances the smooth circulation of the balls 6.

When the slider 2 is engaged with the guide rail 1 in the above-described manner, there is formed a small gap between them. The small gap is sealingly covered by the sealing members 31 both from front and from rear which are secured to both ends of the slider body 3.

Now, the operation of the linear guide device thus constructed will be described.

It is assumed that the guide rail 1 is fixedly mounted on a predetermined stand with bolts, and the slider 2 is mounted on a given table. As the table is driven, the slider 2 is moved along the guide rail 1. As the slider 2 is moved in this manner, the balls 6 in the spaces defined by the load ball rolling grooves 1B of the guide rail 1 and the load ball rolling grooves 3B of the slider body 3, while being rolled, are moved in the spaces at a speed lower than the speed of movement of the slider 2 but in the same direction as the slider 2. Thus, the balls 6 are moved towards the flanges 4g of the circulator 4. When each of the balls 6 reaches the respective flange 4g, it is scooped up into the curved groove 4h by the ball scooping protrusion 4i extended from the flange 4g, where it is U-turned. The ball 6 thus U-turned is moved along the non-load ball circulating groove 4e to the opposite curved groove 4h, where it is U-turned again into the aforementioned space defined by the load ball rolling grooves 1B and 3B. Thus, the balls 6 are repeatedly circulated in the above-described manner.

When the slider 2 is moved, the sealing members 31 secured to both ends of the slider 2 are moved with their right and left sides in slide contact with the guide surfaces of the guide rail 1, namely, the inner surfaces of the side walls 1b and 1b of the guide rail 1 and with the surfaces of the load ball rolling grooves 1B and 1B and with their lower surfaces in slide contact with the inner surface of the bottom 1a of the guide rail 1, thus wiping dust or the like off the guide rail 1. Since the sealing members 31 close the gap between the guide rail 1 and the slider 2, to prevent the entrance of dust or the like into the slider 2, the linear guide device of the present invention is operated smoothly for a long time even in a dusty atmosphere. As shown in FIG. 3, there are gaps between the guide rail 1 and the slider 2, exposing the balls 6. However, the entrance of dust or the like into the gaps is sufficiently prevented, for instance, by the table secured to the slider 2.

Furthermore, the sealing members 31 function to prevent the scattering of lubricant out of the slider 2, which lengthens the service life of the linear guide device.

Figure 4:
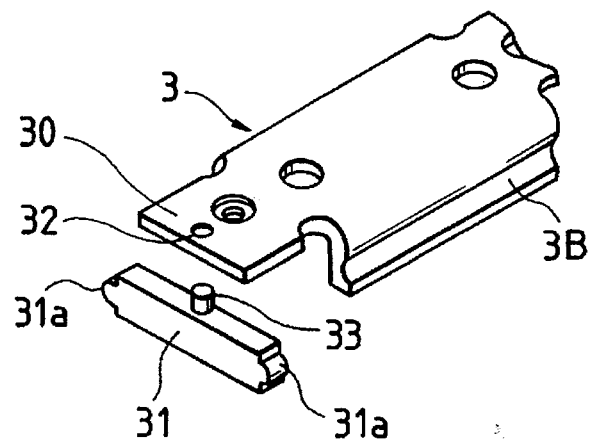
FIGS. 4 through 7 are diagrams showing modifications of the sealing device shown in FIGS. 2A and 2B.
Figure 5:
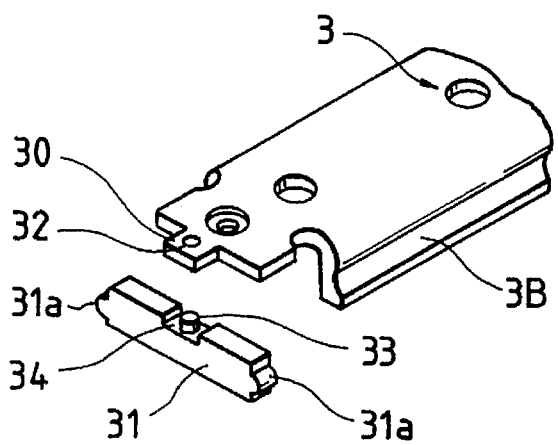
Figure 6:
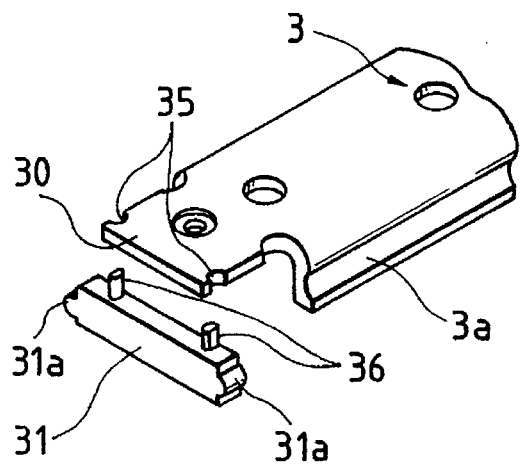

FIGS. 4, 5 and 6 show modifications of the above-described first embodiment, concerning the structure of mounting the sealing members (hereinafter referred to as "a sealing member mounting structure", when applicable).

The modification shown in FIG. 4 is designed as follows: A pair of positioning holes 32 are formed in both end portions of the upper wall 3a of the slider body 3, namely, the flat-plate-shaped protrusions 30 and 30 thereof, respectively. On the other hand, a positioning pin 33 is embedded in the upper surface of each of the sealing members 31. The sealing members 31 are secured to the slider body 3 by inserting the positioning pins 33 into the positioning holes 32.

The modification shown in FIG. 5 is designed as follows: The flat-plate-shaped protrusions 30 and 30 of the slider body 3 are reduced in width, and have positioning holes 32 similarly as in the case of the above-described modification. At the same time, in each of the sealing members 31, a recess 34 is formed in the upper surface so that it is engageable with the protrusion 30, and a positioning pin 33 is extended from the bottom of the recess 34 which is engageable with the positioning hole 32. The sealing members 31 are secured to the slider body 3 by engaging the protrusions 30 with the recesses 34; i.e., by engaging the positioning pins 33 with the positioning holes 32.

The modification shown in FIG. 6 is designed as follows: A pair of semi-circular cuts 35 are formed in the right and left end portions of each of the protrusions 30 and 30 of the slider body 3, while a pair of pins 36 shaped semi-circularly in section are extended from the upper surface of each of the sealing members 31 so that they are engaged with the semi-circular cuts.

The above-described modifications as shown in FIGS. 4, 5 and 6 are so designed that the sealing members 31 may be accurately positioned on the flat-plate-shaped protrusions 30 and 30 of the slider body 3 and secured thereto.

Figure 7:
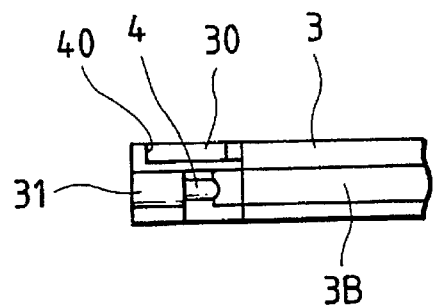

In addition, the sealing member mounting structure may be modified as shown in FIG. 7. That is, a step 40 may be formed on the upper surface of each of the sealing members 31 so that it is engaged with the flat-plate-shaped protrusion 30 of the slider body 3.

Figure 8:
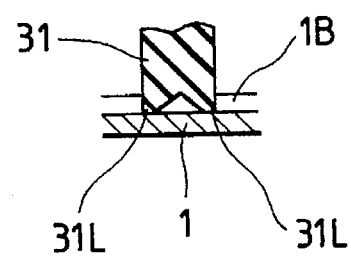
FIG. 8 is a sectional view showing an example of the lip of a sealing member employed in the device of the present invention.

Furthermore, each of the sealing members 31 may be so modified that, as shown in FIG. 8, a plurality of sealing lips 31L arranged in parallel with one another are brought into slide contact with the guide rail 1 (two sealing lips 31L in FIG. 8). With the modification, the sealing performance is much improved even there is a difference between pressures inside and outside the sealing member 31. Hence, the sealing members thus modified are able to more positively prevent the entrance of dust or the like into the slider and the leakage of lubricant from the slider. This can be said about other sealing members described below.

Second Embodiment

Figure 9:
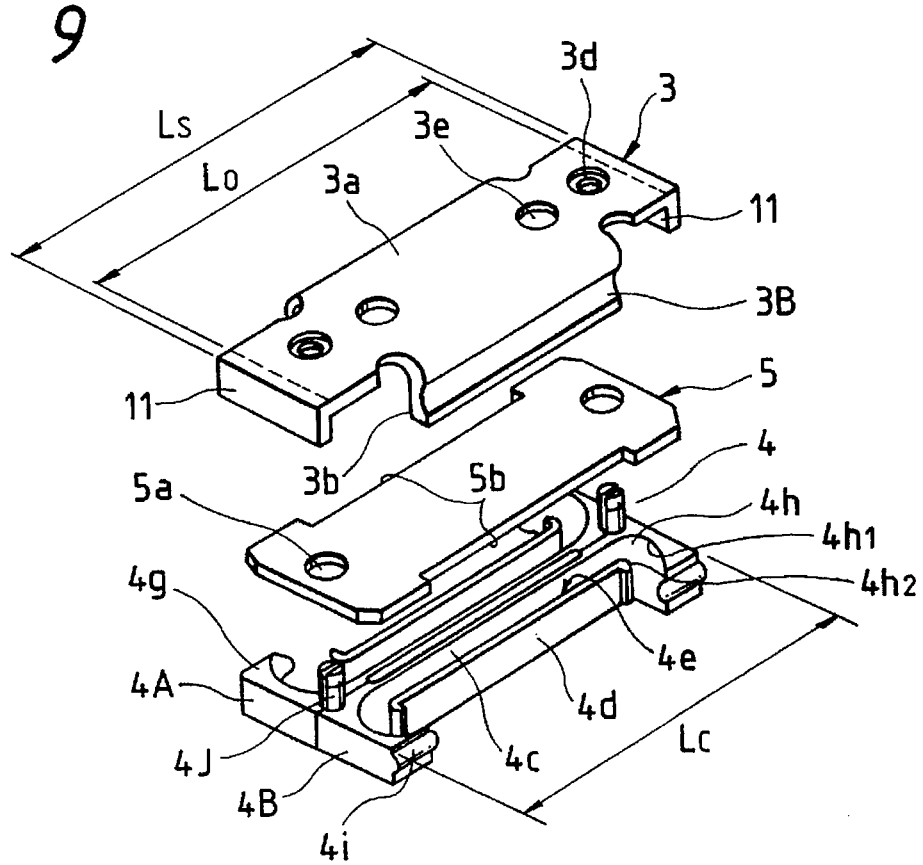
FIG. 9 is an exploded perspective view showing essential components of another example of the light-weight miniature linear guide device, which constitutes a second embodiment of the present invention.
Figure 10:
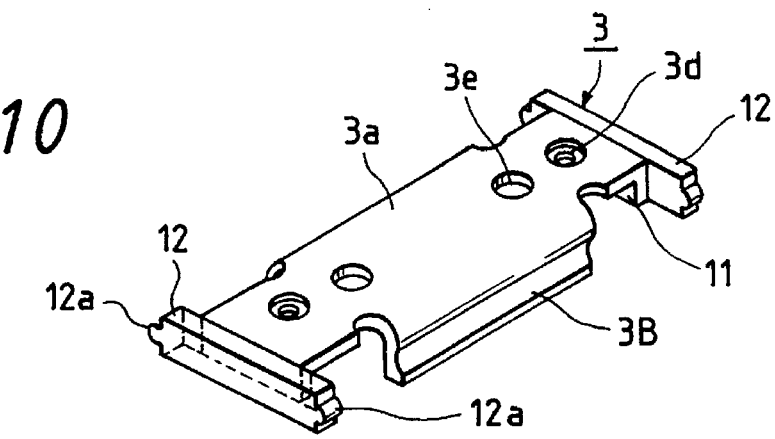
FIG. 10 is a perspective view showing a sealing device in the second embodiment.

FIGS. 9 and 10 shows another example of the miniature linear guide device, which constitutes a second embodiment of the present invention pertaining mainly to the sealing member mounting structure.

In the second embodiment, both end portions of the slider body 3 as viewed longitudinally of the slider body are formed into a pair of protrusions 11 which are downwardly bent substantially at a right angle to an upper surface of the slider body 3, and a pair of sealing members 12 made of synthetic rubber are fixed to the outer surfaces of the protrusions 11 by bonding or welding, respectively (hereinafter referred to as "side seals 12", when applicable). Each of the sealing members 12 are substantially rectangular, and has a pair of semi-circular sealing protrusions 12a extended from its both ends as viewed longitudinally thereof which are brought into slide contact with the load ball rolling grooves 1B of the guide rail 1, respectively. Similarly as in the case of the above-described sealing members 31, when the slider 2 is engaged with the guide rail 1, the sealing members 12 sealingly close the gap formed between the guide rail 1 and the slider 2. In the second embodiment, the sealing members 12 of synthetic rubber are reinforced by the protrusions 11 of the slider body 3, and therefore the sealing members 12 are high in rigidity and are more positively held by the slider body 3. Hence, the sealing members, when slid on the inner surface of the guide rail 1, are prevented from being bent, thus providing a high sealing effect.

In the second embodiment too, the length Ls of the slider body 3 is larger than the length Lc of the circulator 4, and the distance Lo between the inner surfaces of the protrusions 11 and 11 of the slider body 3 is substantially equal to the length Lc of the circulator 4 so that the circulator 4 is fitted in between the protrusions 11 and 11.

Third Embodiment

Figure 11A:
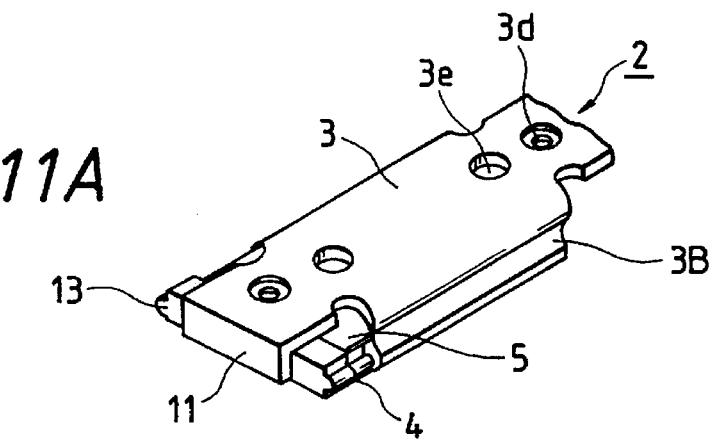
FIGS. 11A, 11B and 11C show a third embodiment of the present invention, more specifically.
Figure 11B:
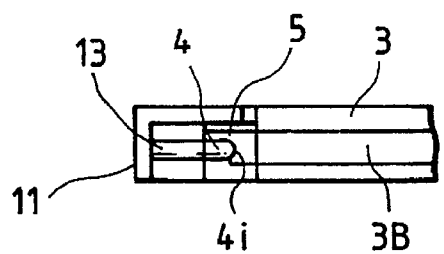
Figure 11C:
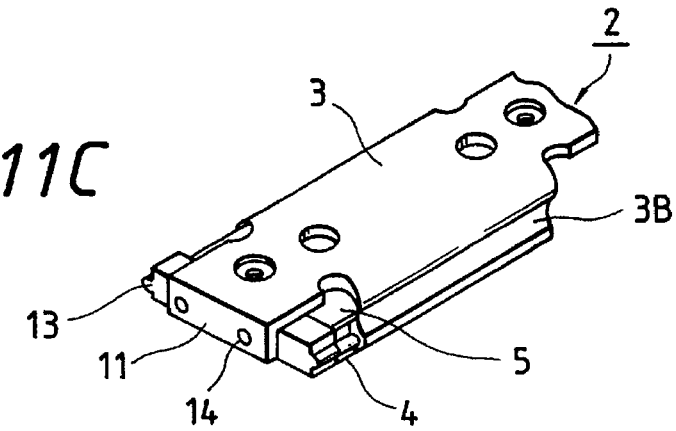

FIGS. 11A, 11B and 11C shows another example of the linear guide device, which constitutes a third embodiment of the present invention, pertaining mainly to the sealing member mounting structure.

Similarly as in the above-described second embodiments, both end portions of the slider body 3 as viewed longitudinally of the slider body are formed into protrusions 11 and 11 which are downwardly bent substantially at a right angle to the upper surface of the slider body 3. However, the third embodiment is different from the second embodiment in that the sealing members (or side seals) 13 are fixedly secured to the inner surfaces of the protrusions 11 by bonding or welding. Each of the sealing members 13 is held between the inner surface of one of the protrusions 11 and one of the end faces of the circulator 4. Hence, the sealing members 13 are more positively held than those in the second embodiment; that is, they scarcely come off the slider 2.

In the third embodiment, the distance between the inner surfaces of the pair of protrusions 11 of the slider body 3 is substantially equal to the sum of the length Lc of the circulator 4 and the thicknesses of the two sealing members 13.

Furthermore, in the third embodiment, the sealing members 13 are fixed to the protrusions 11 by bonding or welding. However, it is not always required to fix the sealing members to the protrusions 11; that is, they may be merely set in the spaces which are defined by the inner surfaces of the protrusions 11 and the outer end faces of the circulator 4. In this case, the sealing members 13 are quickly adjusted to the inner surfaces of the guide rail. Hence, the linear guide device is free from difficulties that the sealing members 13 are somewhat shifted when fixed, whereby the slider 2 is increased in slide resistance, and the sealing members are irregularly worn out.

FIG. 11C shows one modification of the third embodiment shown in FIGS. 11A and 11B. In the modification, the sealing members 13 are secured to the protrusions 11 of the slider body 3 with screws or rivets 14. The modification is advantageous in that the sealing members 13 can be replaced with ease, when compared with the above-described device in which the sliding members 13 are fixed to the protrusions 11 by bonding or welding.

Fourth Embodiment

Figure 12:
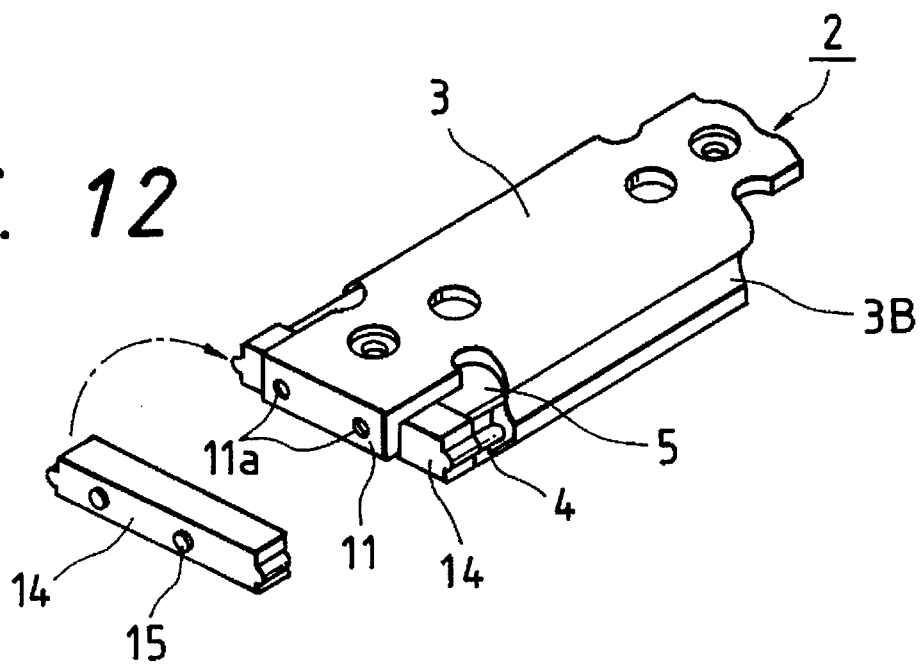
FIG. 12 is a perspective view showing a sealing device in a fourth embodiment of the present invention.

FIG. 12 shows another example of the linear guide device, which constitutes a fourth embodiment of the present invention, mainly concerning the sealing member mounting structure.

In the fourth embodiment, similarly as in the case of the third embodiment, both end portions of the slider body 3 as viewed longitudinally are formed into protrusions 11 which are downwardly bent substantially at a right angle to the upper surface of the slider body 3. However, the fourth embodiment is different from the third embodiment in that two positioning through-holes 11a are formed in each of the protrusions 11, and each of sealing members 14 made of synthetic rubber has two engaging protrusions 15 formed on its outer surface which are engaged with the through-holes 11a. With the engaging protrusions 15 engaged with the positioning through-holes 11a, the sealing members 14 can be accurately positioned on the protrusions 11 of the slider body 3 when fixed to them.

Figure 13:
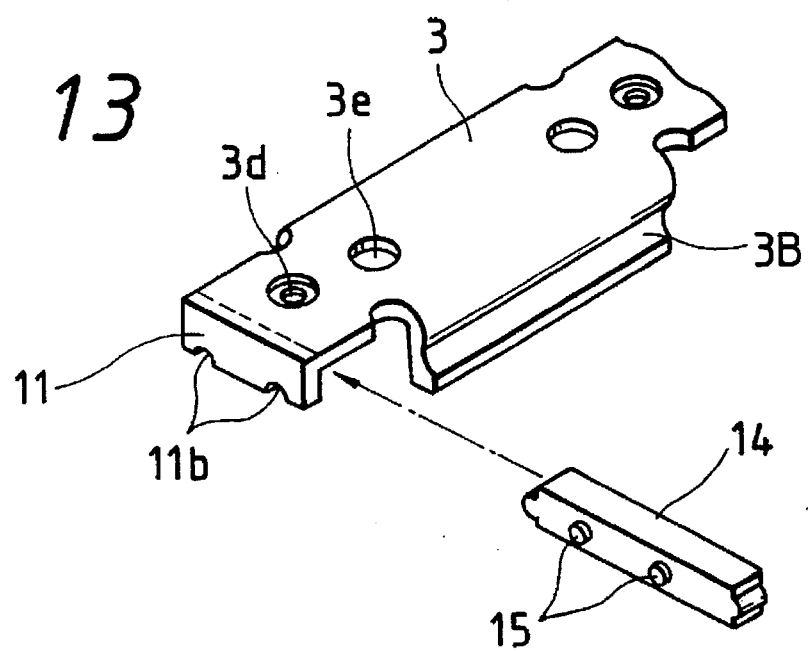
FIG. 13 is an exploded perspective view showing one modification of the sealing device illustrated in FIG. 12.

FIG. 13 shows one modification of the above-described fourth embodiment of the present invention. In the modification, instead of the positioning through-holes 11a, a pair of cuts 11b are formed in the lower end portion of each of the protrusions 11 of the slider body 3. The sealing members 14 are positioned by engaging the engaging protrusion 15 with the cuts 11b. In this case, the sealing members can be mounted on the protrusions 11 of the slider body 3 after the circulator 4 is secured to the slider body 3. Hence, the circulator 4 can be thermally welded to the slider body 3 with high efficiency.

Fifth Embodiment

Figure 14A:
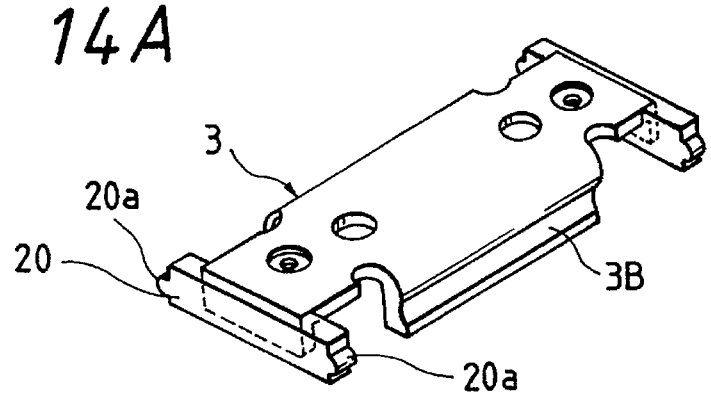
FIGS. 14A and 14B are a perspective view and a sectional view, respectively, showing a sealing device in the fifth embodiment of the present invention.
Figure 14B:
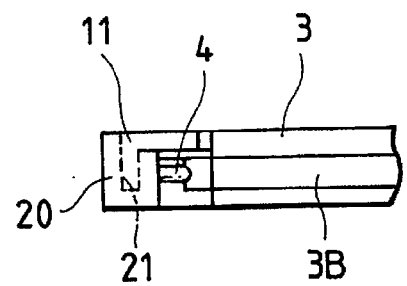

FIGS. 14A and 14B shows another example of the linear guide device, which constitutes a fifth embodiment of the present invention, pertaining mainly to the sealing member mounting structure.

In the fifth embodiment, the slider body 3 has substantially the same protrusions 11 as the slider body shown in FIG. 9. The protrusions 11 are inserted into engaging grooves 21 which are formed in the upper surfaces of sealing members 20 of synthetic rubber, to secure the sealing members 20 to the protrusions 11 of the slider body 3. When the slider is engaged with the guide rail, the right and left sealing ears 20a of the sealing members 20 are brought into close contact with the surfaces of the load ball rolling grooves 1B of the guide rail 1, so that the sealing members 20 are positioned laterally of the slider; whereas they are positioned longitudinally of the slider with the protrusions 11 being engaged with the engaging grooves 21 formed in the sealing members 20.

In the fifth embodiment, the protrusions 11 and 11 of the slider body 3 serve not only to position the sealing members 20 and but also to reinforce and fix the sealing members 20. Hence, it is unnecessary to fix the sealing members 20 to the protrusions 11 by bonding or welding.

Sixth Embodiment

Figure 15:
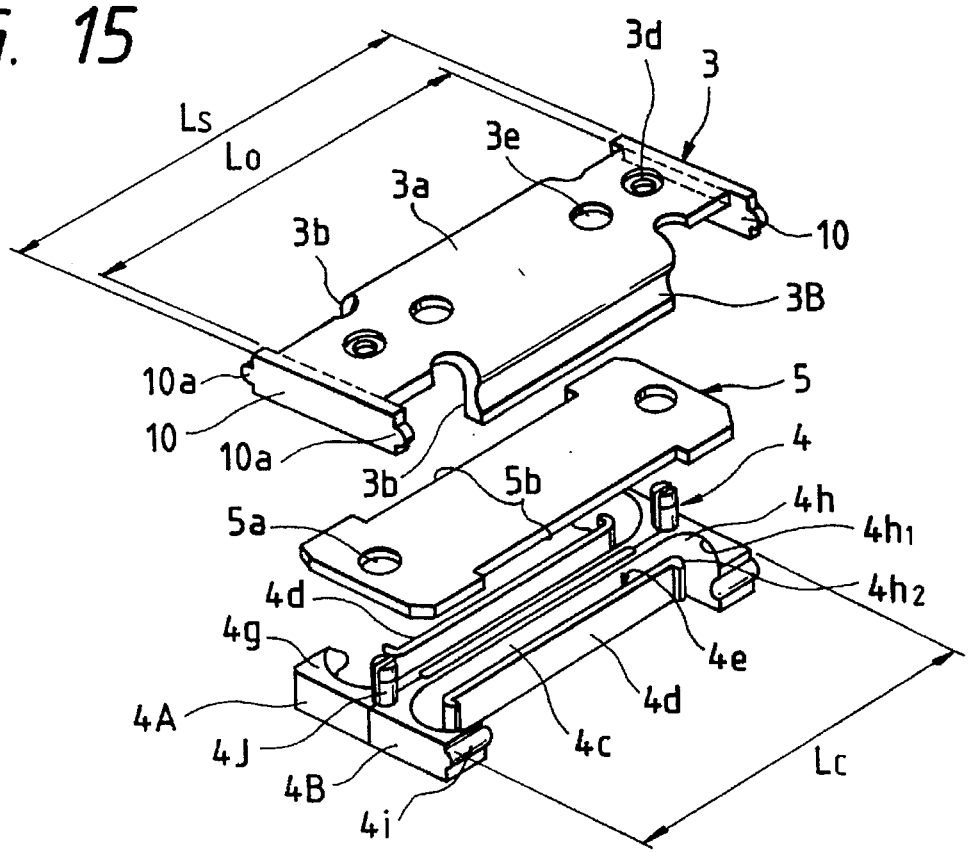
FIG. 15 is an exploded perspective view showing essential components of a sixth embodiment of the present invention.
Figure 16:
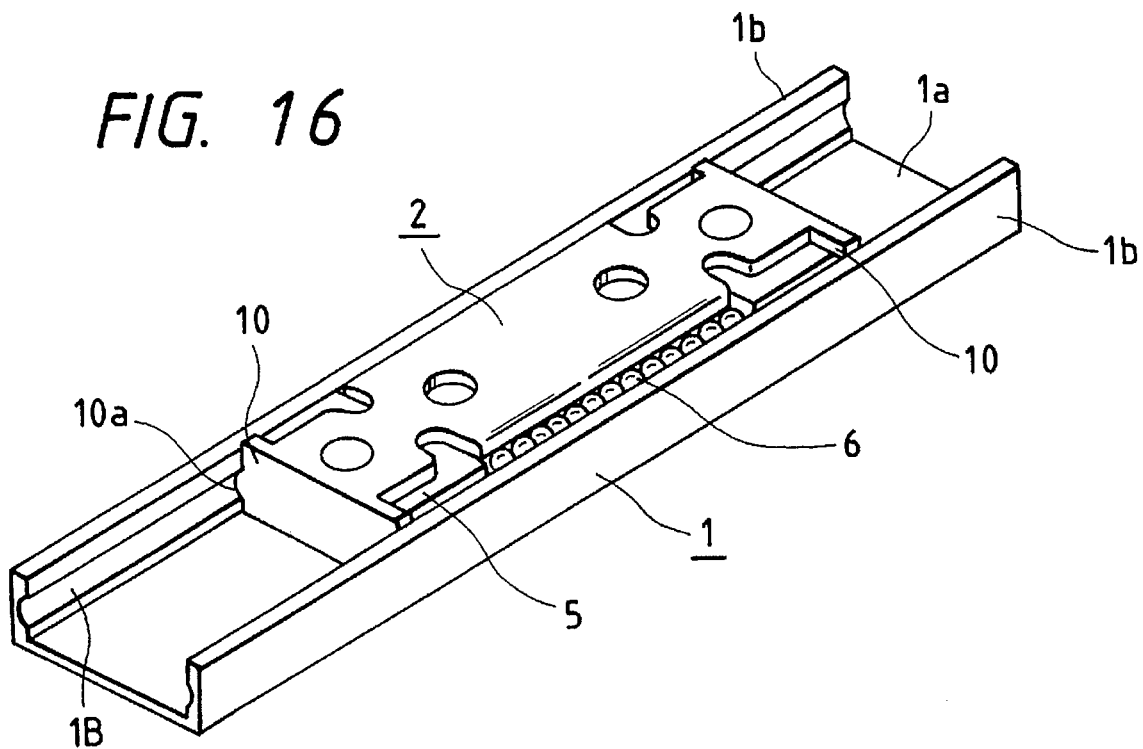
FIG. 16 is a perspective view of the essential components shown in FIG. 15 which have been assembled.

FIGS. 15 and 16 shows a sixth embodiment of the present invention.

In the sixth embodiment, the length Ls of the slider body 3 is larger than that Lc of the circulator 4, and as viewed longitudinally of the slider body 3 both end portions of the slider body 3 are bent downwardly to form a pair of scrapers 10 and 10 in such a manner that the distance Lo between the inner surfaces of the scrapers 10 thus formed is substantially equal to the length Lc of the circulator 4. Hence, the circulator 4 can be fitted in between the scrapers 10 and 10.

Each of the scrapers 10 is so shaped that its section is defined by the inner surfaces of the bottom 1a and of the side walls 1b and 1b of the guide rail 1, and has a pair of semi-circular ears 10a and 10a respectively on its right and left ends which are engaged with the load ball rolling grooves 1B of the guide rail 1. Hence, when the slider is engaged with the guide rail 1, the scrapers 10 and 10 sealingly close the gap at both ends which is formed between the slider 2 and the guide rail 1.

When the slider 2 is moved along the guide rail 1, the right and left side surfaces of the scrapers 10 are moved along the inner surfaces of the guide surfaces, namely, the side walls 1b and 1b of the guide rail 1 and the surfaces of the load ball rolling grooves 1B of the guide rail 1 with an extremely small gap between them while the lower surfaces of the scrapers 10 are also moved along the surface of the bottom 1a of the guide rail 1 with an extremely small gap between them, to remove foreign matters from the guide rail 1. The scrapers 10 are able to remove foreign matters such as those sputtered during welding which are high in temperature to damage the sealing members and those which are stuck fast to the guide rail and cannot be wiped off with the sealing members which are generally of rubber or plastic material.

Seventh Embodiment

Figure 17:
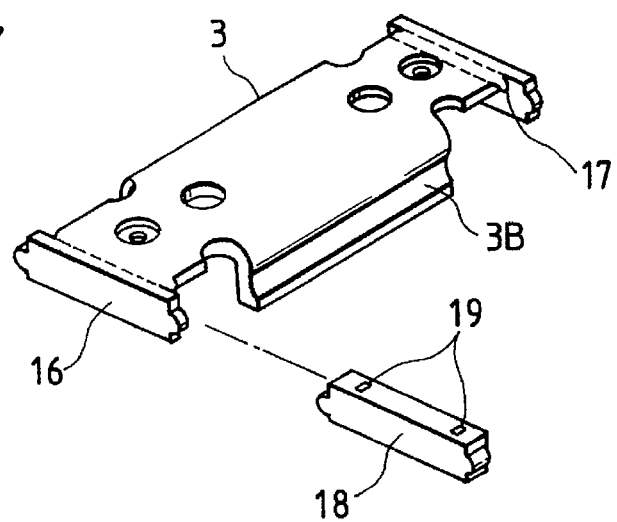
FIG. 17 is a perspective view showing a sealing device in a seventh embodiment of the present invention.

FIG. 17 shows a seventh embodiment of the present invention.

In the seventh embodiment, its slider body 3 has a pair of scrapers 16 and 16 at both ends which are substantially equal to those 10 in the above-described sixth embodiment. In addition, the slider body 3 has a pair of supporting protrusions 17 and 17 beside each of the scrapers 16. More specifically, the supporting protrusions 17 are extended right and left at the end portions of the slider body 3 near a bending line along which the scraper 16 is bent. Further, the supporting protrusions 17 are bent downwardly to engage with a sealing member 18 (described below). The distance between the inner surfaces of the scrapers 16 and 16 is substantially equal to the sum of the length Lc of the circulator 4 and the thicknesses of two sealing members 18.

The sealing members 18 are made of synthetic rubber, and are substantially equal in configuration and in dimension to the sealing members 13 shown in FIGS. 11A through 11C, and have engaging holes 19 in the upper surfaces into which the supporting protrusions 17 are inserted to support the sealing members 18. That is, in the seventh embodiment, the sealing members 18 are attached to the slider body 3 having the scrapers 16, so that foreign matters such as dust can be more effectively removed from the guide rail.

In the above-described embodiments, the sealing members are in slide contact with the bottom 1a of the guide rail; however, the present invention is not limited thereto or thereby. That is, as the case may be, the slider may be so designed that the sealing members are not in slide contact with the bottom of the guide rail, and the slider is reduced in slide resistance as much.

As described above, the light-weight miniature linear guide device of the present invention provides: the slider made up of the circulator including the non-load ball circulating paths, the slider being fitted in the guide rail, and moved along the guider rail with the aid of a number of balls which, while being rolled, are circulated in the aforementioned non-load ball circulating paths. In the device, both end portions of the slider body are formed into the pair of protrusions which overhang the circulator at both ends, and the protrusions are secured to the sealing members which sealingly close the gap at both ends which is formed between the slider body and the inner surface of the guide rail and the surfaces of the load ball rolling grooves.

Hence, the linear guide device of the present invention is free from the difficulty that, as in the case of the conventional linear guide device, dust enters the slider through the gaps between the guide rail and the front and rear end faces of the slider, and the lubricant scatters out of the slider. That is, the linear guide device of the present invention is maintained satisfactory in operation for a long time.

These effects can be obtained merely by connecting the sealing members simple in construction to the slider, which reduces the manufacturing cost of the linear guide device and lengthens the service life of the device as much.

On the other hand, the light-weight miniature linear guide device of the present invention in which the pair of protrusions of the slider body includes the pair of scrapers which are set in close proximity to the inner surfaces of the guide rail is advantageous in that the foreign matters can be readily removed which have stuck fast to the guide rail and cannot be removed with the sealing members, which enhances the smooth operation of the device.

What is claimed is:

1. A light-weight miniature linear guide device comprising:

a guide rail substantially U-shaped in section which is extended in a longitudinal direction of the device, the guide rail including a first load ball rolling groove formed on an inner surface of a side wall of the guide rail and extended longitudinally;

a slider including:

a slider body substantially U-shaped in section which is adapted to be fitted in the side wall of the guide rail, the slider body including a second load ball rolling groove formed on an outer surface of a side wall of the slider body and confronted with the first load ball rolling groove of the guide rail, and including a protrusion formed in a longitudinal end portion of the slider body; and a circulator being fitted in the slider body so that the protrusion of the slider body overhangs a longitudinal end portion of the circulator, the circulator having a non-load ball circulating path which is extended longitudinally;

a plurality of balls fitted to roll in a space defined by the first and second load ball rolling grooves and the non-load ball circulating path of the circulator; and a sealing member secured to the protrusion to sealingly close a gap formed between the inner surface of the guide rail and the slider body.

2. The light-weight miniature linear guide device of claim 1, wherein a length of the protrusion corresponds to a thickness of the sealing member made of synthetic rubber, the sealing member being secured to a lower surface of the protrusion.

3. The light-weight miniature linear guide device of claim 1, wherein the sealing member has a semi-circular sealing ear at an end thereof and a lip on its side, the sealing ear being brought into slide contact with the first load ball rolling groove of the guide rail, the lip being brought into slide contact with the inner surface of the guide rail so that the slider is sealingly engaged with the guide rail.

4. The light-weight miniature linear guide device of claim 3, wherein the sealing member has a plurality of lips arranged in parallel with one another, the lips being brought into slide contact with the inner surface of the guide rail.

5. The light-weight miniature linear guide device of claim 1, wherein the slider further comprises a cap interposed between the slider body and the circulator, the cap including a through-hole formed at a longitudinal end thereof for inserting a cylindrical engaging protrusion formed in the circulator and a cut formed in a side portion thereof so that the cut is loosely engaged with the side wall of the slider body.

6. The light-weight miniature linear guide device of claim 1, wherein the protrusion includes a positioning hole formed in an end portion thereof and the sealing member includes a positioning pin embedded in an upper surface thereof so that the sealing member is secured to the slider body by inserting the positioning pin into the positioning hole.

7. The light-weight miniature linear guide device of claim 6, wherein the protrusion having the positioning hole is reduced in width and the sealing member includes a recess formed in the upper surface thereof so that the sealing member is secured to the slider body by engaging the protrusion with the recess and by engaging the positioning pin extended from a bottom of the recess with the positioning hole.

8. The light-weight miniature linear guide device of claim 1, wherein the protrusions includes a semi-circular cut formed in a side end portion thereof and the sealing member includes a positioning pin shaped semi-circularly in section and extended from an upper surface thereof so that the sealing member is secured to the slider body by engaging the positioning pin with the semi-circular cut.

9. The light-weight miniature linear guide device of claim 1, wherein the sealing member includes a step formed on the upper surface so that the step is engaged with a longitudinal end portion of the protrusion.

10. The light-weight miniature linear guide device of claim 1, wherein the protrusion is formed by downwardly bending the longitudinal end portion of the slider body substantially at a right angle to an upper surface of-the slider body and the sealing member made of synthetic rubber are fixed to an outer surface of the protrusion.

11. The light-weight miniature linear guide device of claim 1, wherein the protrusion is formed by downwardly bending the longitudinal end portion of the slider body substantially at a right angle to an upper surface of the slider body and the sealing member made of synthetic rubber are held between an inner surface of the protrusion and a longitudinal end surface of the circulator.

12. The light-weight miniature linear guide device of claim 11, wherein the sealing member is secured to the protrusion with a screw or a rivet.

13. The light-weight miniature linear guide device of claim 11, wherein the protrusion includes a positioning through-hole formed therein and the sealing member includes an engaging protrusion formed on an outer surface thereof so that the engaging protrusion is engaged with the positioning through-hole.

14. The light-weight miniature linear guide device of claim 11, wherein the protrusion includes a positioning cut formed therein and the sealing member includes an engaging protrusion formed on an outer surface thereof so that the engaging protrusion is engaged with the positioning cut.

15. The light-weight miniature linear guide device of claim 1, wherein the protrusion is formed by downwardly bending the longitudinal end portion of the slider body substantially at a right angle to an upper surface of the slider body and the sealing member includes an engaging groove formed in an upper surface thereof so that the protrusion is inserted into the engaging groove to secure the sealing member made of synthetic rubber to the protrusion.

16. A light-weight miniature linear guide device comprising:

a guide rail substantially U-shaped in section which is extended in a longitudinal direction of the device, the guide rail including a first load ball rolling groove formed on an inner surface of a side wall of the guide rail and extended longitudinally;

a slider including:

a slider body substantially U-shaped in section which is adapted to be fitted in the side wall of the guide rail, the slider body including a second load ball rolling groove formed on an outer surface of a side wall of the slider body and confronted with the first load ball rolling groove of the guide rail, and including a protrusion formed in a longitudinal end portion of the slider body, the protrusion including a scraper in close proximity to the inner surface of the said guide rail; and a circulator being fitted in the slider body so that the protrusion of the slider body overhangs a longitudinal end portion of the circulator, the circulator having a non-load ball circulating path which is extended longitudinally; and a plurality of balls fitted to roll in a space defined by the first and second load ball rolling grooves and the non-load ball circulating path of the circulator.

17. The light-weight miniature linear guide device of claim 16, further comprising a sealing member made of synthetic rubber and having an engaging hole in an upper surface thereof, wherein the slider body includes a supporting protrusion extended at the longitudinal end portion of the slider body near a bending line along which the scraper is bent, the supporting protrusion being bent downwardly to engage with the engaging hole of the sealing member so that the sealing member are held between an inner surface of the scraper and the longitudinal end surface of the circulator.

18. The light-weight miniature linear guide device of claim 16, wherein the scraper is formed by downwardly bending the protrusion to sealingly close a gap formed between the inner surface of the guide rail and the slider body, the scraper including a semi-circular ear engaged with the first load ball rolling groove of the guide rail.

* * * * *